(12) United States Patent
Stupar et al.

(10) Patent No.: US 8,995,800 B2
(45) Date of Patent: Mar. 31, 2015

(54) METHOD OF FABRICATING SILICON WAVEGUIDES WITH EMBEDDED ACTIVE CIRCUITRY

(75) Inventors: Philip A. Stupar, Oxnard, CA (US); Robert L. Borwick, III, Thousand Oaks, CA (US); Robert E. Mihailovich, Newbury Park, CA (US); Jeffrey F. DeNatale, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 320 days.

(21) Appl. No.: 13/542,996

(22) Filed: Jul. 6, 2012

(65) Prior Publication Data

US 2014/0205231 A1    Jul. 24, 2014

(51) Int. Cl.
*G02B 6/12* (2006.01)
*G02B 6/136* (2006.01)

(52) U.S. Cl.
CPC . *G02B 6/12* (2013.01); *G02B 6/136* (2013.01)
USPC ............................................. 385/14; 438/59

(58) Field of Classification Search
None
See application file for complete search history.

(56) References Cited

U.S. PATENT DOCUMENTS

| | | | |
|---|---|---|---|
| 4,409,566 A * | 10/1983 | Patton et al. | 333/26 |
| 4,585,299 A * | 4/1986 | Strain | 385/132 |
| 4,789,642 A | 12/1988 | Lorenzo et al. | |
| 5,841,931 A | 11/1998 | Foresi et al. | |
| 5,903,697 A | 5/1999 | Yamada et al. | |
| 5,913,134 A * | 6/1999 | Drayton et al. | 438/456 |
| 6,063,299 A | 5/2000 | Drake et al. | |
| 6,392,508 B1 * | 5/2002 | Damphousse et al. | 333/209 |
| 6,775,455 B1 | 8/2004 | Mattsson | |
| 6,850,683 B2 | 2/2005 | Lee et al. | |
| 6,891,985 B2 | 5/2005 | Delwala | |
| 7,000,434 B2 | 2/2006 | Murali | |
| 7,010,208 B1 | 3/2006 | Gunn, III et al. | |
| 7,084,058 B2 * | 8/2006 | Ahn et al. | 438/652 |
| 7,118,682 B2 | 10/2006 | Patel et al. | |
| 7,158,701 B2 | 1/2007 | Dautartas | |
| 7,263,760 B2 * | 9/2007 | Peterson et al. | 29/600 |
| 7,288,944 B1 * | 10/2007 | Tonn | 324/639 |
| 7,418,166 B1 | 8/2008 | Kapur et al. | |
| 7,528,403 B1 | 5/2009 | Borselli et al. | |
| 7,563,628 B2 | 7/2009 | Koch et al. | |

(Continued)

OTHER PUBLICATIONS

IEEE and IP.com search results list for (silicon waveguide) and (e-plane probe), Sep. 29, 2014.*

(Continued)

*Primary Examiner* — Andrew Jordan
(74) *Attorney, Agent, or Firm* — Koppel, Patrick, Heybl & Philpott (57) ABSTRACT

A method of fabricating silicon waveguides with embedded active circuitry from silicon-on-insulator wafers utilizes photolithographic microfabrication techniques to define waveguide structures and embedded circuit recesses for receiving integrated circuitry. The method utilizes a double masking layer, one layer of which at least partially defines at least one waveguide and the other layer of which at least partially defines the at least one waveguide and at least one embedded circuit recess. The photolithographic microfabrication techniques are sufficiently precise for the required small structural features of high frequency waveguides and the double masking layer allows the method to be completed more efficiently. The basic fabrication method may be extended to provide batch arrays to mass produce silicon waveguide devices.

16 Claims, 5 Drawing Sheets

(56) References Cited

U.S. PATENT DOCUMENTS

| | | | |
|---|---|---|---|
| 7,792,393 | B2 | 9/2010 | Hochberg et al. |
| 7,799,589 | B2 | 9/2010 | Akiyama et al. |
| 7,986,201 | B2 * | 7/2011 | Jarno et al. ............... 333/239 |
| 8,503,848 | B2 * | 8/2013 | Mathal et al. ............ 385/129 |
| 8,737,772 | B2 * | 5/2014 | Dong et al. .................. 385/2 |
| 2003/0052082 | A1 | 3/2003 | Khan et al. |
| 2003/0081924 | A1 | 5/2003 | Yegnanarayanan et al. |
| 2005/0158002 | A1 | 7/2005 | Kubby et al. |
| 2006/0125575 | A1 * | 6/2006 | Kim et al. ................. 333/134 |
| 2007/0090089 | A1 | 4/2007 | Chang et al. |
| 2008/0197362 | A1 * | 8/2008 | Hisamoto et al. ........... 257/86 |
| 2008/0267239 | A1 | 10/2008 | Hall et al. |
| 2010/0055906 | A1 | 3/2010 | Carothers et al. |
| 2010/0086255 | A1 | 4/2010 | Ishizaka |
| 2010/0295083 | A1 * | 11/2010 | Celler ........................ 257/98 |
| 2011/0158582 | A1 | 6/2011 | Su et al. |
| 2012/0195564 | A1 * | 8/2012 | Mathai et al. ............. 385/129 |
| 2014/0205231 | A1 * | 7/2014 | Stupar et al. ............... 385/14 |
| 2014/0254979 | A1 * | 9/2014 | Zhang et al. ............... 385/14 |

OTHER PUBLICATIONS

Maestrini, et al. "A High Efficiency Multiple-Anode 260-340 GHz Frequency Tripler", Jet Propulsion Laboratory, California Institute of Technology, under a contract with the National Aeronautics and Space Administration and at the Universite' Pierre et Marie Curie-Paris 6 and the Observatory of Paris, 4 pages.

* cited by examiner

METHOD OF FABRICATING SILICON WAVEGUIDES WITH EMBEDDED ACTIVE CIRCUITRY

STATEMENT REGARDING FEDERALLY SPONSORED RESEARCH AND DEVELOPMENT

This invention was made with government support under Contract Number HR0011-09-C-0060 under the THETA Program & GO 71325 Defense Advanced Research Projects Agency (DARPA). The government has certain rights to this invention.

FIELD OF THE INVENTION

This invention relates generally to silicon-based waveguides, and more particularly to fabrication methods utilizing embedded active circuitry with said waveguides and the resulting structures.

BACKGROUND OF THE INVENTION

High frequency waveguides are commonly made from brass split blocks using conventional machining. This gives rise to several problems. For example, waveguides for higher frequencies require extremely small features and precise dimensional control. For example, a 670 Ghz waveguide (WR 1.5) requires a 191 µm waveguide width and corresponding depth. Conventional machining processes are typically not precise enough for such high frequency waveguides. Additionally, production of these waveguides is a slow and expensive process, and the resulting waveguides cannot be easily integrated into arrays. Furthermore, as waveguides get smaller and begin operating at frequencies approaching the terahertz (THz) range, the placement of integrated circuitry such as control circuits with E-Plane probes must become increasingly precise; up to micron accuracy may be required.

The Jet Propulsion Laboratory (JPL) of the National Aeronautics and Space Administration (NASA) has made waveguides with chip recesses out of brass using conventional machining. These waveguides suffer from problems similar to those mentioned above. The precision with which an integrated circuit can be placed within such a waveguide is largely dependent on the precision of the machine used. Such commonly used machines are generally not capable of the necessary precision discussed above.

The above processes used to fabricate waveguides require multiple steps, which translates into increased cost, lost time and decreased productivity. These waveguide fabrication methods also do not address the issue of providing the precision needed to install integrated circuitry into a waveguide with exceedingly small features within micron accuracy.

SUMMARY OF THE INVENTION

A silicon (Si) waveguide fabrication method is presented which overcomes the problems noted above, providing high frequency Si waveguides with integrated circuitry, precise features and a simplified fabrication method.

The present method relies on using a silicon-on-insulator (SOI) wafer with precisely defined layers. A double masking layer is formed on the SOI wafer, leaving at least one portion of the surface of the SOI wafer unmasked. The first layer of the double masking layer is arranged to define the dimensions of the first half of a waveguide and an embedded circuit recess to receive a circuit having an associated embedded circuit thickness and embedded circuit width. The second masking layer is arranged to define the dimensions of the first half of the waveguide only.

The unmasked portions of the SOI wafer are then etched, defining a portion of the first half of the waveguide, by etching through the buried insulator to a depth equal to the desired waveguide depth minus the embedded circuit thickness. The second layer of the double masking layer is then removed, unmasking at least one additional portion of the SOI wafer. Another etch is then conducted to define the circuit recess and to complete the etching of the remaining portion of the desired waveguide depth. The resulting waveguide structure is one half of a complete waveguide. The photolithographic etching process allows for structure formation within sub-micron accuracy.

The first layer of the double masking layer is then removed, as are the exposed portions of the buried insulator layer. A conductive material is then deposited on the surface of the SOI wafer. An integrated circuit is then installed into the embedded circuit recess.

The second half of the waveguide structure is produced as above. The two halves are then bonded together to form a complete waveguide with embedded active circuitry.

These and other further features and advantages of the invention would be apparent to those skilled in the art from the following description, taken together with the accompanying drawings, in which:

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF THE INVENTION

The present method is directed to a means for fabricating Si based waveguides with embedded active circuitry. The basic method steps are illustrated in the series of sectional views shown in FIGS. 1a-1e, which show a fabrication method for forming a Si waveguide structure that constitutes one-half of a complete Si waveguide. In the step shown in FIG. 1a, a SOI wafer 100 is provided. SOI wafer 100 comprises a first Si layer 102, a buried insulator layer 104, which is typically an oxide layer, on first Si layer 102, and a second Si layer 106, which can serve as the device layer, on buried insulator layer 104. Preferably, buried insulator layer 104 comprises silicon dioxide ($SiO_2$). By using a SOI wafer, wherein the various layers can have dimensions precisely specified during fabrication of the wafer, the dimensions of the post-etch structures can also be precisely defined. For example, pre-calculating the thickness of second Si layer 106 to be equal to a desired thickness 108 for an embedded circuit, the manufacturing method can be simplified (as will be discussed below).

It is understood that when an element or layer is referred to as being "on", "connected to", "coupled to" or "in contact with" another element or layer, it can be directly on, connected or coupled to, or in contact with the other element or layer, or intervening elements or layers may be present. In contrast, when an element is referred to as being "directly on," "directly connected to", "directly coupled to" or "directly in contact with" another element or layer, there are no intervening elements or layers present.

Figure 1A:
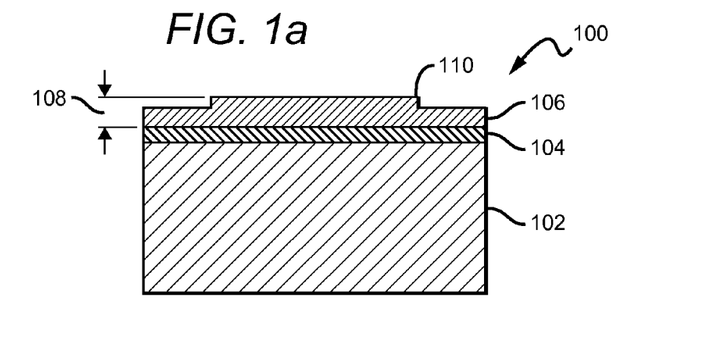
FIGS. 1a-1e are sectional views of a fabrication method for forming a Si waveguide structure that constitutes one-half of a complete Si waveguide.

In one embodiment of the present method, an optional raised Si mesa 110 can be formed on second Si layer 106. While it is not necessary to form raised Si mesa 110, the mesa can be advantageous as it serves to minimize the bonding area of the completed waveguide device, thereby increasing the bonding pressure and facilitating a bond with no voids extending into the waveguide area. Raised Si mesa 110 should be wide enough to accommodate the formation of the desired waveguide trench(s) and circuit recess(es) (which will be discussed further below). Raised Si mesa 110 can be formed using conventional etching and/or other micro-fabrication techniques, with the preferred method being a wet or dry photolithographic etch. In one embodiment of the present method, the thickness of raised Si mesa 110 is equal to desired embedded circuit thickness 108, while the thickness of the portions of second Si layer 106 not constituting raised Si mesa 110 is less than desired embedded circuit thickness 108.

Figure 1B:
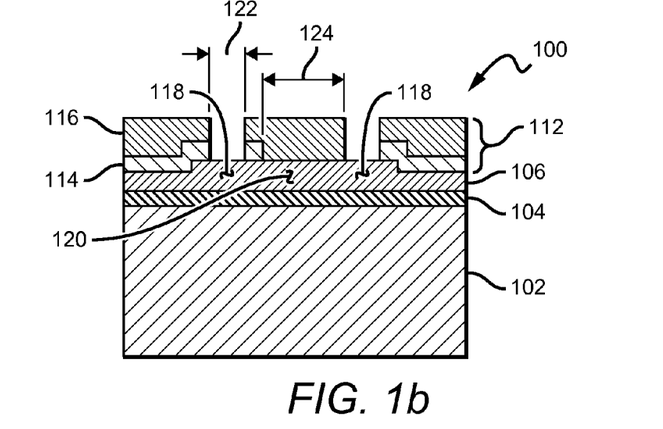

In the step shown in FIG. 1b, a double masking layer 112 is provided on second Si layer 106 of SOI wafer 100. Double masking layer 112 comprises a first masking layer 114 on second Si layer 106, and a second masking layer 116 on first masking layer 114. In addition to the portions of second Si layer 106 that are masked by both layers (114, 116) of double masking layer 112, there is at least one unmasked portion 118 of second Si layer 106 (two portions shown), and at least one partially masked portion 120 of second Si layer 106 (one shown); partially masked portion 120 is only masked by second masking layer 116. These unmasked and/or partially masked portions will at least partially define the relevant dimensions of the waveguide trench and circuit recess structures. For example, unmasked portion 118 of second Si layer 106 can correspond to a desired waveguide trench width 122. Likewise, partially masked portion 120 of second Si layer 106 can correspond to a desired embedded circuit width 124. It is important to note that at least one partially masked portion 120 of second Si layer 106 should be near enough to an unmasked portion 118 of second Si layer 106 to enable an embedded integrated circuit to be near enough to a waveguide trench structure to interact with the completed waveguide (as will be discussed in further detail below).

First masking layer 114 can comprise any suitable masking material that is known in the art, with the preferred material being a material that will not be damaged or etched by the process chosen to remove second masking layer 116. In one embodiment of the present method, first masking layer 114 and buried insulator layer 104 comprise the same material. For example, in embodiments of the present method wherein buried insulator layer 104 comprises $SiO_2$, first masking layer 114 would also comprise $SiO_2$. This particular embodiment is advantageous as first masking layer 114 and exposed portions of buried insulator layer 104 can be removed in a single step (which will be discussed in further detail below), thus simplifying the fabrication method and conserving resources.

Second masking layer 116 can comprise any suitable masking material that is known in the art, with the preferred material being a material that can be selectively removed by a process that will not damage or etch underlying first masking layer 114. A preferred material for second masking layer 114 is a photoresist material. The use of photoresist materials is known in the art. Such materials can be easily applied, patterned and removed without negatively affecting underlying masking layers.

Figure 1C:
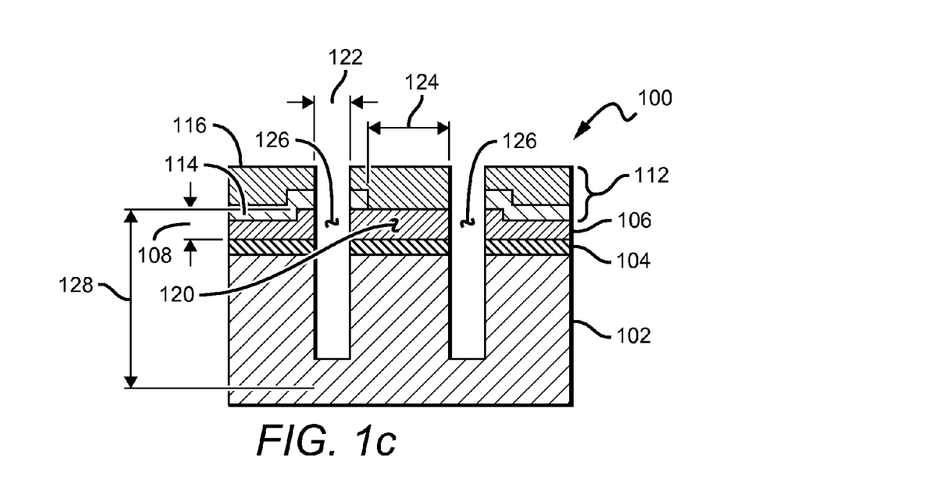

In FIG. 1c, unmasked portions 118 of second Si layer 106 are subjected to a first etch and are etched through second Si layer 106, through buried insulator layer 104, and partially into first Si layer 102, forming a first portion of at least one waveguide trench structure 126 (two shown). These waveguide trench structures are an active portion of the completed waveguide. It is understood that the term "waveguide" as used in this disclosure can refer to both the waveguide trench structures and the completed waveguide itself. The waveguide depth can be further controlled by using a timed etch or by using an SOI wafer with multiple layers. In one embodiment, unmasked portions 118 are etched to a depth corresponding to a desired waveguide depth 128 minus desired embedded circuit thickness 108. During this etch, double masking layer 112, including first masking layer 114 and second masking layer 116, is arranged to at least partially define the dimensions of this first portion of waveguide trench structure 126, by masking portions of the surface of SOI wafer 100 that are not to be etched.

In addition to at least partially defining the first portion of the dimensions of trench structure 126, second masking layer 116 is also arranged to cover partially masked portion 120. Accordingly, second masking layer 116 protects underlying second Si layer 106 from the etch. Additionally, aside from at least partially defining the first portion of the dimensions of trench structure 126, first masking layer 114 at least partially defines partially masked portion 120, and therefore at least partially defines the relevant dimensions of a circuit recess structure. Such dimensions can include, for example, embedded circuit width 124 and embedded circuit thickness 108.

Any wet or dry photolithographic process can be used to carry out the above described etch. Resulting structures defined by photolithographic processes will have precisely defined features with sub-micron accuracy. The preferred etching method is deep reactive ion etching (DRIE). A preferred DRIE process known as the Bosch process utilizes time-sequenced alternating etch and passivation steps. An etchant such as sulfur hexafluoride $SF_6$ is used to etch a portion of waveguide trench structure 126. To passivate the side wall of waveguide trench structure 126 and prevent further lateral etching, an insulating layer is subsequently deposited using a separate gas composition which includes a species such as octafluorocyclobutane $C_4F_8$. This process is repeated until the desired depth is achieved. Etching via this process allows for high selectivity and achieves substantially vertical side walls, with aspect ratios as high as 40:1 or more. This high aspect ratio facilitates the production of smaller diameter cavities and smaller via-to-via spacings, as it reduces the amount of lateral blooming during etching.

Figure 1D:
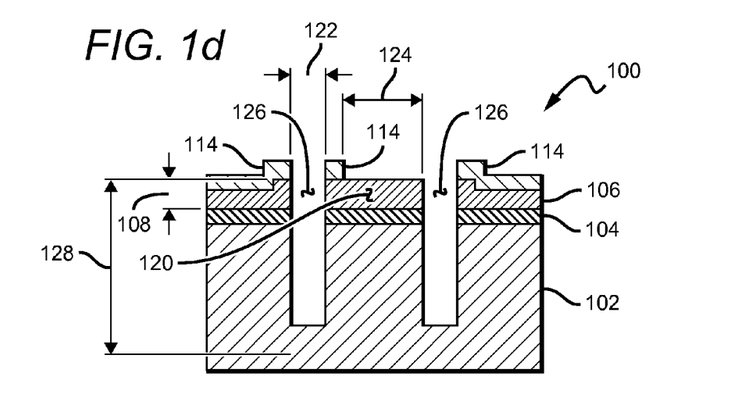

In FIG. 1d, second masking layer 116 of double masking layer 112 is removed, unmasking the previously partially masked portion 120 of second Si layer 106 that has desired relevant dimensions corresponding to a circuit recess structure. The resulting structure on the surface of SOI wafer 100 comprises first masking layer 114, formerly partially masked portion 120, now unmasked, and unmasked partially etched waveguide trench structure 126.

Figure 1E:
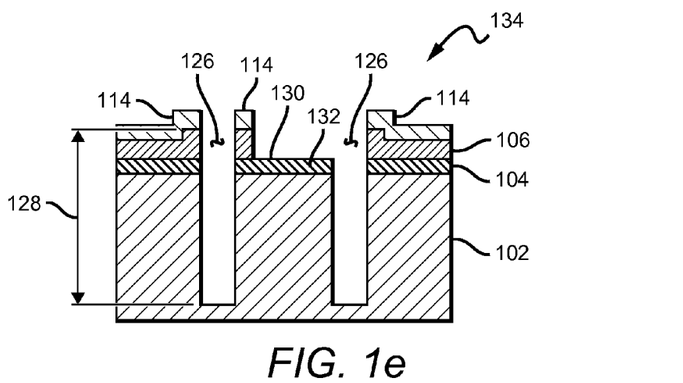

In FIG. 1e, the portions of the surface of SOI wafer 100 that are unmasked by first masking layer 112 are subjected to a second etch. Waveguide trench structure 126 is etched the remaining depth to desired waveguide depth 128. Formerly partially masked portion 120 of second Si layer 106 is etched to the buried insulator layer 104, forming at least one embedded circuit recess 130, for receiving an integrated circuit. An exposed insulator portion 132 of buried insulator layer 104 remains on the Si floor of embedded circuit recess 130.

In one embodiment of the step illustrated in FIG. 1e, where the first etch is done to a depth corresponding to desired waveguide depth 128 minus desired embedded circuit thickness 108, and where the second Si layer 106 has a thickness equal to a desired embedded circuit thickness 108, formerly partially masked portion 120 of second Si layer 106 and waveguide trench structure 126 are both etched by an additional amount equal to desired embedded circuit thickness 108. This results in waveguide trench structure 126 having a depth equal to desired waveguide depth 128 and formerly partially masked portion 120 being etched to the buried insulator layer 104, thus forming embedded circuit recess 130. This particular embodiment is advantageous as it eliminates the need for additional etches and allows both waveguide trench structure 126 and the embedded circuit recess 130 to be formed with more precise dimensions.

The resulting structure provides a Si waveguide structure 134 that corresponds to a completed Si waveguide's first half. Repeating the above steps as depicted in FIGS. 1a-1e will result in providing a Si waveguide structure that corresponds to the completed Si waveguide's second half. Due to the precise nature of the photolithographic etching process, waveguide halves will be identical or nearly identical.

FIGS. 2a-2g illustrate one embodiment of a method according to the present disclosure by which the double masking layer can be provided. In this embodiment, the first masking layer (114 in FIG. 1b above) comprises SiO$_2$ and the second masking layer (116) comprises a photoresist material. Although this embodiment refers to specific preferred materials, it is understood that mask layers of different materials can be patterned and etched or portions removed or added in a manner similar to the disclosed methods.

Figure 2A:
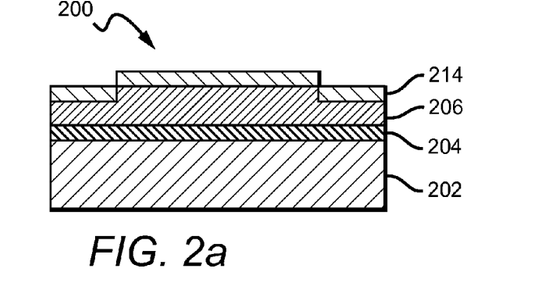
FIGS. 2a-2g are sectional views of a fabrication method for forming a double masking layer for use in the fabrication method for forming a Si waveguide structure that constitutes one-half of a complete Si waveguide.

FIG. 2a illustrates a SOI wafer 200 similar to the SOI wafer 100 depicted in FIG. 1a. SOI wafer 200 in FIG. 2a comprises a first Si layer 202, a buried insulator layer 204 on first Si layer 202, and a second Si layer 206 on buried insulator layer 204. In the step illustrated in FIG. 2a, an oxide masking layer 214 is deposited on second Si layer 206. According to this particular embodiment, oxide masking layer 214 will eventually become first masking layer 114.

Figure 2B:
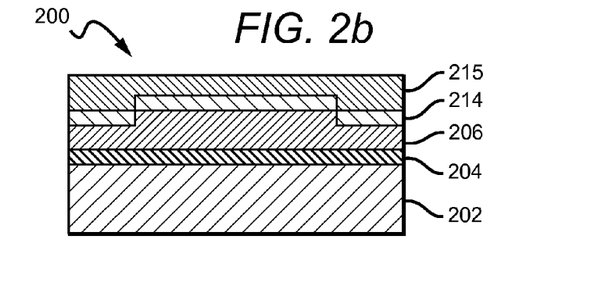
Figures 2C, 2D, 2E, 2F, 2G:
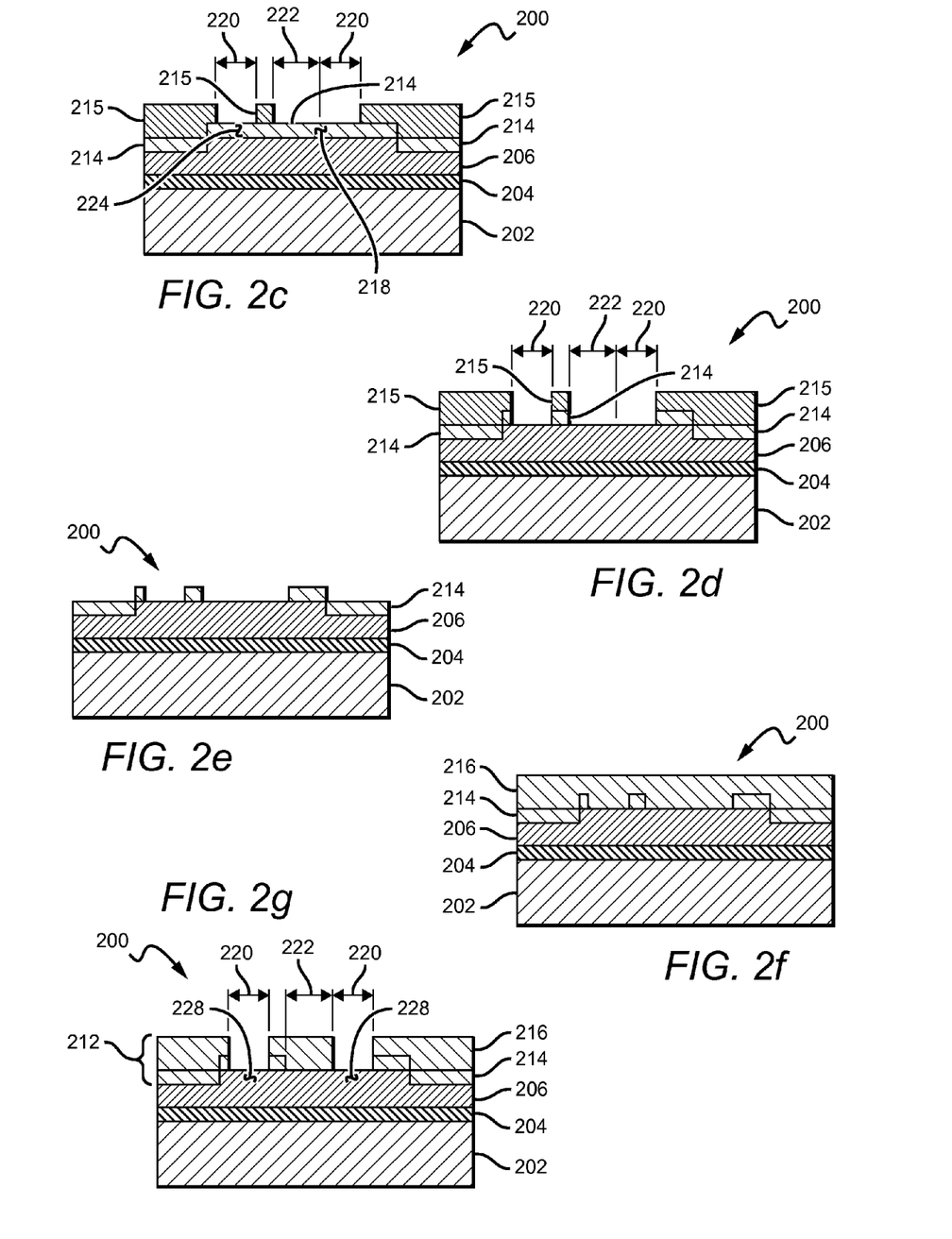

FIG. 2b illustrates the next step in which a first photoresist masking layer 215 is deposited over the entire surface of oxide masking layer 214. Either a positive or negative photoresist can be used. As shown in FIG. 2c, first photoresist masking layer 215 is then patterned and developed, leaving at least some of underlying oxide masking layer 214 unmasked. The unmasked portions of underlying oxide masking layer include a least one unmasked circuit recess portion 218, corresponding to a desired waveguide trench width 220 plus a desired embedded circuit width 222, and any other remaining additional portions 224 (one shown) corresponding to desired waveguide trench width 220, or corresponding to the desired waveguide trench width plus the desired embedded circuit width.

FIG. 2d illustrates the next step, which is the removal of the unmasked oxide portions (218, 224 above). FIG. 2e illustrates the next step, which is the removal of first photoresist masking layer 215. As shown in FIG. 2f, a second photoresist masking layer 216 is then deposited over the surface of oxide masking layer 214 and over the exposed portions 226 of second Si layer 206, which correspond to the oxide portions etched in the step depicted in FIG. 2e (218, 224 above). According to this particular embodiment, second photoresist masking layer 216 will eventually become second masking layer 116.

FIG. 2g illustrates the next step, in which second photoresist masking layer 216 is patterned and developed such that an equivalent number of portions of second Si layer 206 are left unmasked as there were unmasked oxide portions in the step described above (i.e. 218, 224) and depicted in FIG. 2c. These unmasked second Si layer portions 228 are located in the regions where oxide masking layer 214 was etched away above. These unmasked second Si layer portions 228 have a width equal to the desired waveguide trench width 220. There is also at least one portion now masked only by the second photoresist masking layer 216 which covers the desired embedded circuit width 222. The resulting mask layer is double masking layer 212, comprising oxide masking layer 214 and second photoresist masking layer 216. According to this particular embodiment, double masking layer 212 will become double masking layer 112.

Figures 3A, 3B, 3C, 3D:
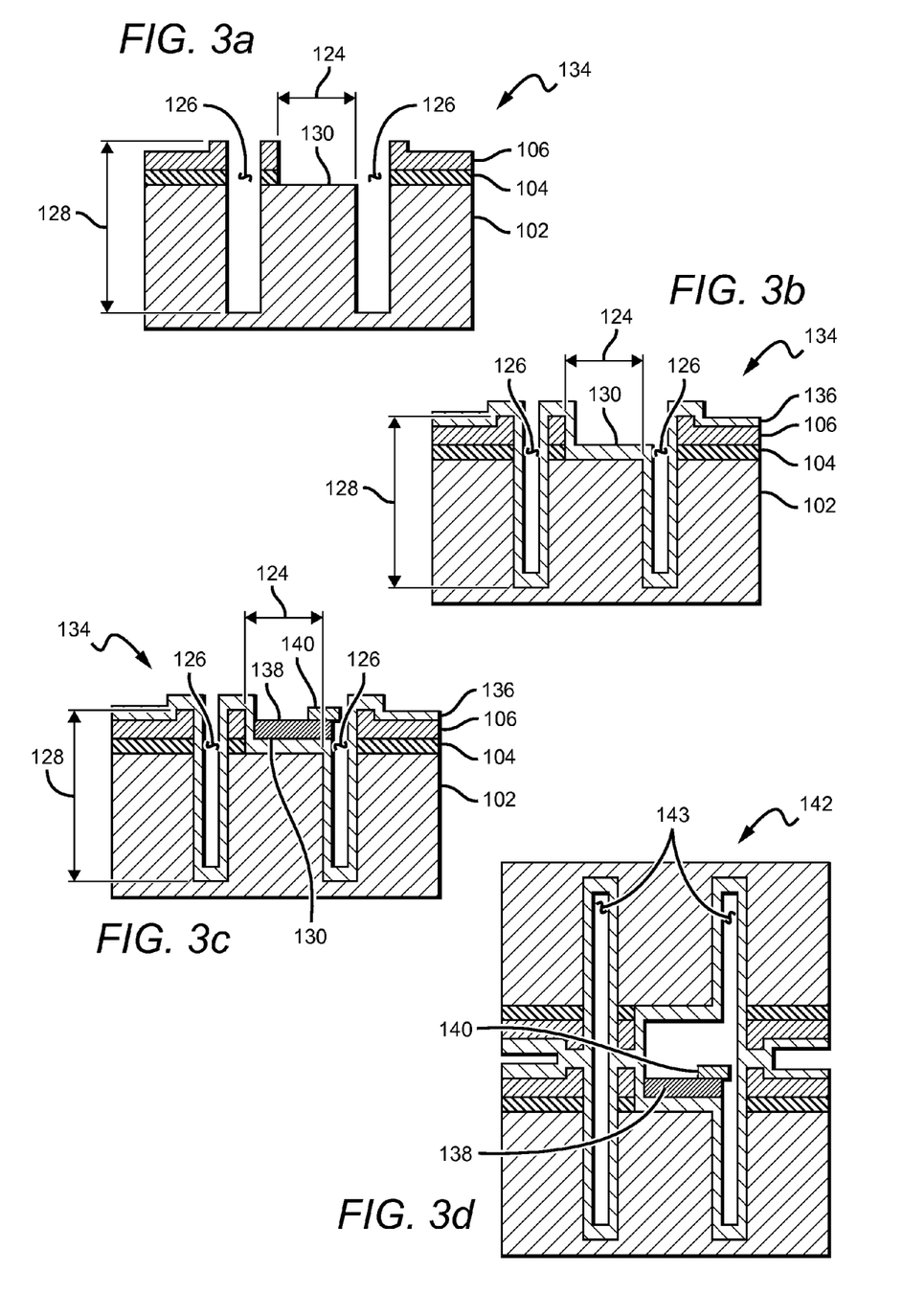
FIGS. 3a-3d are sectional views of a fabrication method for forming a complete waveguide with integrated embedded circuitry.

The basic method steps for installing a recessed integrated circuit into a Si waveguide structure 134 and forming a complete waveguide with embedded integrated circuitry are illustrated in the series of sectional views shown in FIGS. 3a-3d. FIG. 3a shows waveguide structure 134 produced according to the steps outlined above and illustrated in FIG. 1a-1e, in which first masking layer 114 and exposed insulator portion 132 have been removed. In one already mentioned embodiment, buried insulator layer 104 and first masking layer 114 comprise the same material and can be simultaneously removed in this step with a single process. This simplifies the method and conserves time and resources. During the previous etching processes described above, exposed insulator portion 132 acted as an etch stop layer and protected the underlying Si floor of circuit recess 130, insuring a favorable undamaged and substantially flat surface upon which an integrated circuit could be mounted. This etch stop also facilitates precise control of the chip recess depth which will be defined solely by the thickness of second Si layer 106.

In FIG. 3b, a conductive material 136 is deposited over the surface of waveguide structure 134. A preferred conductive material is metal and a preferred metal is gold.

In FIG. 3c, an integrated circuit 138 is installed into embedded circuit recess 130. Integrated circuit 138 can comprise a wide variety of useful functional circuits such as control circuits. Due to the precise nature of the etching process, protective exposed insulator portion 132 discussed above, and the pre-calculated dimensions of the SOI wafer layers, embedded circuit recess 130 is precisely positioned so that integrated circuit 138 can be installed onto a substantially flat surface at a precise depth and in a precise position in relation to waveguide trench structure 126. This is important as waveguide devices begin to operate at higher frequencies and require increasingly smaller features and more precise dimensional control. Integrated circuit 138 can be placed using any acceptable conventional means known in the art. Since the area in which integrated circuit 138 is to be installed, i.e. embedded circuit recess 130, has such precisely formed dimensions, integrated circuit 138 can even be placed using a manually operated machine.

Integrated circuit 138 can further comprise an E-Plane probe 140. E-Plane probe 140 provides a means by which integrated circuit 138 can interact with the complete waveguide. E-Plane probe 140 can function as a waveguideto-microstrip transition for converting and directing electromagnetic wave signals to integrated circuit 138. E-Plane probe 140 extends from integrated circuit 138 into waveguide trench structure 126. As E-Plane probe 140 must be positioned in relation to waveguide trench structure 126 with micron accuracy, E-Plane probe 140 is usually co-fabricated with integrated circuit 138 prior to the integrated circuit being installed into embedded circuit recess 130.

In FIG. 3*d*, the structure depicted in FIG. 3*c* above is bonded to a like structure produced according to the steps depicted in FIGS. 1*a*-1*e* and 3*a*-3*b* above, thus forming a complete waveguide 142 with embedded integrated circuit 138. Any acceptable bonding means that is known in the art can be used, including temporarily clamping the two structures together in a fixture, however, the preferred bonding means being a thermocompression bond. The first and second halves of the waveguide trench structures are thus aligned to form complete waveguide 142 with complete waveguide trenches 143. Using this method of fabricating waveguides allows for batch processing of waveguides. Waveguide structures constituting first and second halves can be fabricated simultaneously across wafers, facilitating cost effective waveguide arrays.

Figure 4:
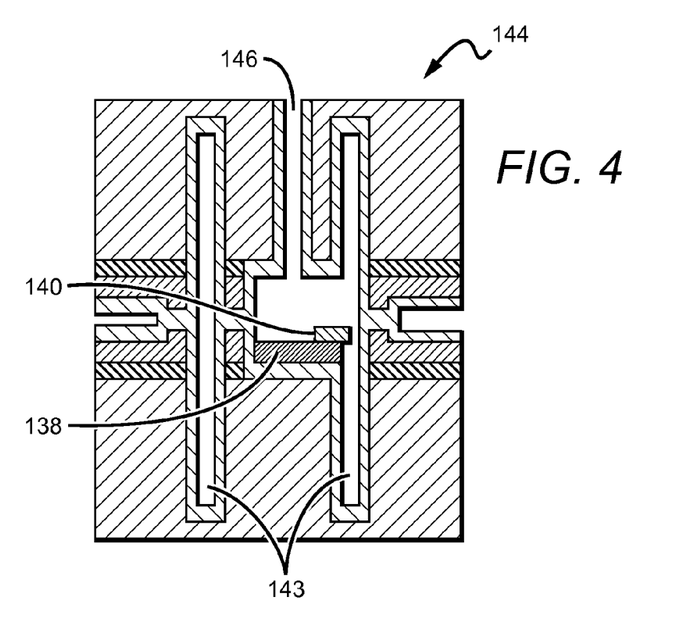
FIG. 4 is a sectional view of a complete waveguide with integrated embedded circuitry with a top chip-probe access port.
Figure 5:
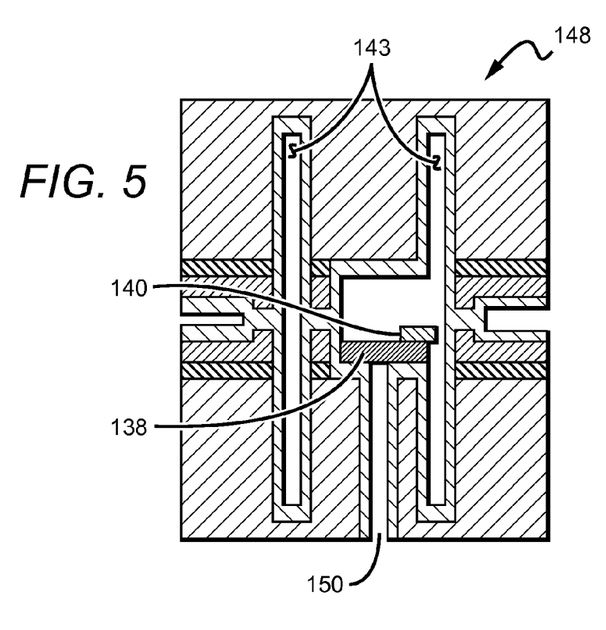
FIG. 5 is a sectional view of a complete waveguide with integrated embedded circuitry with a bottom chip-probe access port.

FIGS. 4-5 show two embodiments of complete waveguides produced according to the present method. FIG. 4 shows a complete waveguide 144 with a top chip-probe access port 146 and FIG. 5 shows complete waveguide 148 with a bottom chip-probe access port 150. A chip-probe access port is an opening in the Si waveguide structure (i.e. 134 in FIG. 1*e* above) which provides outside access to structures contained within a completed waveguide; for example, an outside connection to an installed integrated circuit 138 might pass through access port 150.

In one embodiment of the present invention, a chip-probe access port can be etched into Si waveguide structure 134 prior to the deposition of conductive material 136. In this embodiment, conductive material 136 can cover the sidewalls of the chip-probe access port. The chip-probe access port can be etched anywhere into Si waveguide structure 134, or a corresponding half of the structure, so long as the chip-probe access port does not substantially interfere with the function of the completed waveguide. For example, a chip-probe access port can be etched in relation to embedded circuit recess 130 of either the first or second half of a completed waveguide structure, such that an integrated circuit is either partially on or under the access port. One possible method of etching a "bottom" chip probe access port in which at least part of an integrated circuit is on the access port, is by etching the port from the underside of SOI wafer 100 through a portion of embedded circuit recess 130 upon which an integrated circuit will rest.

As noted above, outside connections to installed integrated circuit 138 can be routed through access port 150. Alternatively or in addition, input/output lines (not shown) which send and/or receive signals to and from integrated circuit 138 can be provided. These input/output lines can be run across second Si layer 106, for example, across the lower portion of embedded circuit recess 130. The input/output lines would be made of, coated with or treated with a conductive material. In one embodiment, the input/output lines are metalized. In another embodiment, the input/output lines are formed through a lithographic process during the processing of the waveguide. If the input/output lines are formed before the deposition of conductive material 136, a patterning process can be used to prevent conductive material 136 from depositing over the lines. These lines can be used in lieu of, or in addition to, the chip-probe access port structure discussed above. One advantage of using the input/output lines in lieu of a chip-probe access port is that it would simplify the production of an array of waveguide devices.

Waveguide structures produced according to the present method could be used as individual waveguides, or a plurality of them could be formed on a common substrate and arranged into an array, such as in a receiver array. Such receiver arrays typically require a large array of many components (such as waveguides and embedded integrated circuitry), spaced apart at lengths potentially less than a wavelength. One such ideal spacing arrangement of receiver components is λ/2. Due to the precise and accurate nature of the present method, such small, precisely spaced components can be fabricated across a common substrate.

Although the foregoing described the invention with preferred embodiments, this is not intended to limit the invention. While certain specific materials and dimensions were enumerated, unless noted otherwise, other materials and dimensions could be used. For example, where a masking layer was to define the thickness or width of a device layer, it could also define additional dimensions such as length or height. Likewise, while this invention refers to a "double masking layer," it is understood that a triple or otherwise multiple masking layer, wherein the different layers define different portions of structures in an SOI wafer, would also be within this disclosure.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in the claims.

We claim:

1. A method of fabricating a silicon waveguide structure with an embedded circuit, comprising the steps of:
   1) providing a silicon-on-insulator (SOI) wafer;
   2) providing a double masking layer on said SOI wafer, leaving at least one portion of the surface of said SOI wafer unmasked, said double masking layer comprising:
      a first masking layer arranged to define the first half of at least one waveguide which has an associated desired waveguide depth and a circuit recess to receive a circuit having an associated embedded circuit thickness and embedded circuit width;
      a second masking layer on said first masking layer arranged to define said first half of said at least one waveguide;
   3) etching the at least one unmasked portion of said SOI wafer through the buried insulator layer of said SOI wafer to define a portion of the first half of said at least one waveguide, to a depth equal to said desired waveguide depth minus said embedded circuit thickness;
   4) removing said second masking layer, unmasking at least one additional portion of said SOI wafer; and
   5) etching through the unmasked portions of said SOI wafer to define said circuit recess and to complete the etching of the remaining portion of said desired waveguide depth, the resulting waveguide structure providing the first half of a silicon waveguide.

2. The method of claim 1, wherein said first masking layer comprises silicon dioxide.

3. The method of claim 1, wherein said second masking layer comprises photoresist.

4. The method of claim 1, wherein said second masking layer can be removed through a wet or dry etch without damaging said first masking layer.

5. The method of claim 1, further comprising:
repeating steps 1-5 to provide the second half of said silicon waveguide structure;
removing said first masking layer and exposed portions of said insulator layer from the surfaces of said silicon waveguide structure's first and second halves;
depositing a conductive material on the surfaces of said silicon waveguide structure's first and second halves;
embedding said circuit within said circuit recess of one of said silicon waveguide structure's halves; and
attaching said silicon waveguide structure's first half to its second half such that the first and second halves of said at least one waveguide are aligned and form a complete waveguide.

6. The method of claim 5, wherein said embedded circuit comprises an e-plane probe for interacting with said waveguide.

7. The method of claim 5, further comprising providing at least one input/output line to said circuit.

8. The method of claim 5, wherein said conductive material is gold.

9. The method of claim 1, further comprising:
repeating steps 1-5 to provide the second half of said silicon waveguide structure;
removing said first masking layer and exposed portions of said insulator layer from the surfaces of said silicon waveguide structure's first and second halves;
etching at least one chip-probe access port into one or both halves of said silicon waveguide structure, said at least one chip-probe access port allowing outside access to said circuit when embedded within said circuit recess;
depositing a conductive material on the surfaces of said silicon waveguide structure's first and second halves;
embedding said circuit within said circuit recess of one of said silicon waveguide structure's halves; and
attaching said silicon waveguide structure's first half to its second half such that the first and second halves of said at least one waveguide are aligned and form a complete waveguide.

10. The method of claim 9, wherein said embedded circuit is at least partially on said at least one chip-probe access port.

11. The method of claim 9, wherein said embedded circuit is at least partially under said at least one chip-probe access port.

12. The method of claim 1, wherein said step of providing said double masking layer on said SOI wafer comprises:
1) depositing an oxide masking layer on the surface of said SOI wafer;
2) depositing a first photoresist masking layer on said oxide masking layer;
3) patterning and developing said first photoresist masking layer, leaving at least some of the underlying oxide masking layer unmasked, such that at least one unmasked oxide masking layer portion has a width equal to a desired waveguide width plus a desired circuit recess width, and any additional unmasked oxide masking layer portions have either a width equal to said desired waveguide width plus said desired circuit recess width or a width equal to said desired waveguide width;
4) removing the unmasked portions of said oxide masking layer;
5) removing said first photoresist masking layer;
6) depositing a second photoresist masking layer on said oxide masking layer and the unmasked portions of said SOI wafer; and
7) patterning and developing said second photoresist masking layer, leaving unmasked an equivalent number of portions of the surface of said SOI wafer as there were unmasked oxide masking layer portions in step 3, said unmasked SOI wafer portions located in the regions where the unmasked oxide masking layer portions were etched away in step 4, wherein said unmasked SOI wafer portions have a width equal to said desired waveguide width.

13. The method of claim 1, further comprising forming a raised silicon mesa structure on the surface of said SOI wafer, such that said raised silicon mesa structure is formed prior to the step of providing a double masking layer on said SOI wafer.

14. The method of claim 13, further comprising:
repeating steps 1-5 and said step of forming a raised silicon mesa structure on the surface of said SOI wafer between steps 1 and 2, such that the second half of said silicon waveguide structure is provided;
removing said first masking layer and said oxide layer from the surfaces of said silicon waveguide structure's first and second halves;
depositing a conductive material on the surfaces of said silicon waveguide structure's first and second halves;
embedding said circuit within said circuit recess of one of said silicon waveguide structure's halves; and
attaching said silicon waveguide structure's first half to its second half such that the first and second halves of said at least one waveguide are aligned and such that said raised silicon mesa structure on said silicon waveguide structure's first and second halves are aligned so as to form a complete waveguide and to minimize the total bonding area between said waveguide structure's first and second halves.

15. The method of claim 14, further comprising providing at least one input/output line to said circuit.

16. The method of claim 13, wherein said forming a raised silicon mesa structure on the surface of said SOI wafer comprises:
depositing a mesa masking layer on the surface of said SOI wafer, said mesa masking layer arranged to define a desired thickness of said raised silicon mesa structure;
patterning and developing said photoresist mesa masking layer, leaving unmasked portions of the underlying surface of said SOI wafer on both sides of said photoresist masking layer;
etching the unmasked portions of the underlying surface of said SOI wafer to a desired depth to produce said desired height of said raised silicon mesa; and
removing said photoresist mesa masking layer.

* * * * *